(12) United States Patent
Shah et al.

(10) Patent No.: US 10,427,241 B2
(45) Date of Patent: Oct. 1, 2019

(54) JOINT DESIGN FOR IMPROVED STRENGTH OF PLASTIC AND COMPOSITE JOINTS

(71) Applicant: GM Global Technology Operations LLC, Detroit, MI (US)

(72) Inventors: Bhavesh Shah, Troy, MI (US); Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 708 days.

(21) Appl. No.: 14/794,096

(22) Filed: Jul. 8, 2015

(65) Prior Publication Data

US 2017/0008120 A1    Jan. 12, 2017

(51) Int. Cl.
*B23K 20/00* (2006.01)
*B29C 65/00* (2006.01)
(Continued)

(52) U.S. Cl.
CPC ............ *B23K 20/10* (2013.01); *B23K 20/233* (2013.01); *B23K 20/24* (2013.01); *B29C 65/08* (2013.01);
(Continued)

(58) Field of Classification Search
CPC ........ B23K 20/00; B23K 20/10; B23K 20/10; B23K 20/106; B29C 65/00; B29C 65/08; B29C 65/60; B29C 65/60; B29C 65/601; B29C 65/70; B29C 65/72; B29C 66/00; B29C 66/10; B29C 66/11; B29C 66/11; B29C 66/112; B29C 66/112; B29C 66/1122; B29C 66/20; B29C 66/21;
(Continued)

(56) References Cited

U.S. PATENT DOCUMENTS

| | | | | |
|---|---|---|---|---|
| 5,110,381 A | * | 5/1992 | Heckard | B29C 66/8246 156/358 |
| 2012/0097339 A1 | * | 4/2012 | Hull | B29C 65/08 156/580.1 |
| 2013/0214026 A1 | * | 8/2013 | Mayer | A61B 17/0401 227/175.1 |

FOREIGN PATENT DOCUMENTS

| | | |
|---|---|---|
| DE | 102010010327 A1 | 10/2010 |
| DE | 102009044210 A1 | 4/2011 |
| WO | WO20101002255 | * 9/2010 |

OTHER PUBLICATIONS

Http://en.wikipedia.org/wiki/Ultrasonic_welding ; Ultrasonic Welding; 8 pages.

(Continued)

*Primary Examiner* — Jacob T Minskey
*Assistant Examiner* — Matthew Hoover
(74) *Attorney, Agent, or Firm* — BrooksGroup

(57) ABSTRACT

A number of variations may include a product that may include a final part that may include a first part that may include a first face and may define at least one through hole and a second part that may include a second face, at least one stake, and at least one energy director that may be disposed between the first face and the second face wherein the first face and the second face may be abutted against one another and the at least one stake may be passed through the at least one through-hole and the first part and the second part have been ultrasonically staked and ultrasonically welded such that an ultrasonically welded interface may be formed between the first part and the second part.

8 Claims, 3 Drawing Sheets

(51) Int. Cl.
 *B23K 20/10*    (2006.01)
 *B29C 65/08*    (2006.01)
 *B29C 65/60*    (2006.01)
 *B29C 65/72*    (2006.01)
 *B23K 20/233*    (2006.01)
 *B23K 20/24*    (2006.01)
 *B23K 103/00*    (2006.01)

(52) U.S. Cl.
 CPC ............ *B29C 65/601* (2013.01); *B29C 65/72* (2013.01); *B29C 66/1122* (2013.01); *B29C 66/21* (2013.01); *B29C 66/3022* (2013.01); *B29C 66/472* (2013.01); *B29C 66/7392* (2013.01); *B23K 2103/00* (2018.08); *B23K 2103/42* (2018.08); *B29C 66/30223* (2013.01); *B29C 66/712* (2013.01); *B29C 66/7212* (2013.01); *B29C 66/72141* (2013.01); *B29C 66/72143* (2013.01); *B29C 66/7394* (2013.01)

(58) Field of Classification Search
 CPC ....... B29C 66/30; B29C 66/30; B29C 66/302; B29C 66/302; B29C 66/3022; B29C 66/40; B29C 66/47; B29C 66/47; B29C 66/472; B29C 66/70; B29C 66/73; B29C 66/73; B29C 66/739; B29C 66/739; B29C 66/7392
 See application file for complete search history.

(56) References Cited

OTHER PUBLICATIONS

German Office Action dated Jan. 2, 2018 ; Application No. 10 2016 112 437.0; GM Global Technology Operations LLC; 5 pages.

\* cited by examiner

JOINT DESIGN FOR IMPROVED STRENGTH OF PLASTIC AND COMPOSITE JOINTS

TECHNICAL FIELD

The field to which the disclosure generally relates includes ultrasonic welding.

BACKGROUND

Ultrasonic welds may have high shear strength but low peel strength. Typically, stakes or rivets are added to the joint to improve peel strength. However, stakes or rivets may have poor shear strength.

SUMMARY OF ILLUSTRATIVE VARIATIONS

A number of variations may include a product that may include a final part that may include a first part that may include a first face and may define at least one through hole and a second part that may include a second face, at least one stake, and at least one energy director that may be disposed between the first face and the second face wherein the first face and the second face may be abutted against one another and the at least one stake may be passed through the at least one through-hole and the first part and the second part have been ultrasonically staked and ultrasonically welded such that an ultrasonically welded interface may be formed between the first part and the second part.

A number of variations may further include a product that may include a final part that may include a first part having a first face and defining at least one first through hole, a second part having a second face and defining at least one second through hole, at least one stake, and at least one energy director disposed between the first face and the second face wherein the at least one stake may be joined through the at least one through-hole and the at least one second through hole, and an ultrasonically staked and ultrasonically welded interface between the first part and the second part.

A number of variations may further include a method that may include providing an ultrasonic welding system may include a press, a power supply, a controller, an ultrasonic stack may include at least one transducer and at least one sonotrode; a first part may include a first face; a second part may include a second face; a stake; and at least one energy director disposed between at least the first face and the second face. The method may further include assembling the first part and the second part wherein the first face abuts the second face and the at least one stake mechanically join the first part and the second part together. The method may further include supplying energy via the power supply to the at least one transducer and to the at least one sonotrode such that the first part and the second part may be ultrasonically staked together and an ultrasonic weld may be formed between the interface of the first face to the second face.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1A:
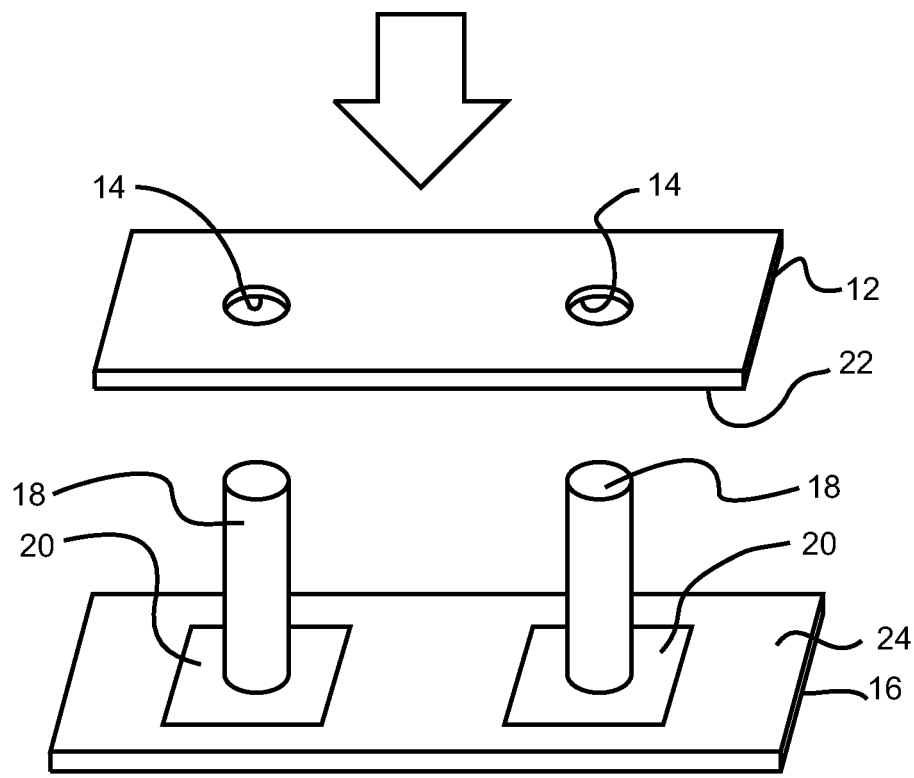
FIG. 1A depicts one variation of a joint design for improved strength of plastic and composite joints.
Figure 1B:
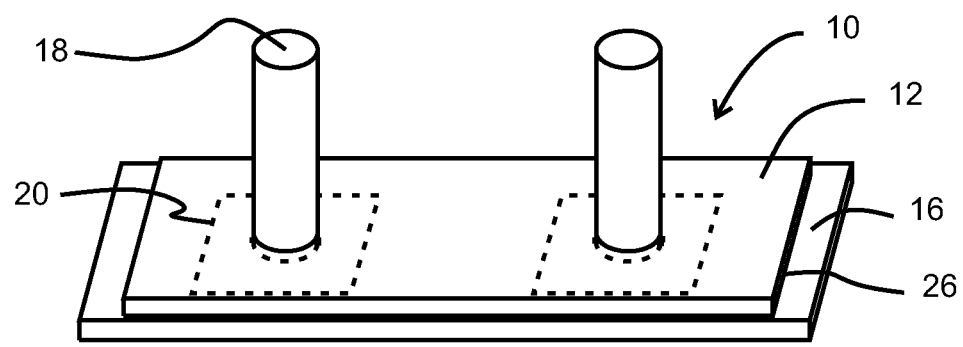
FIG. 1B depicts one variation of a joint design for improved strength of plastic and composite joints.
Figure 1C:
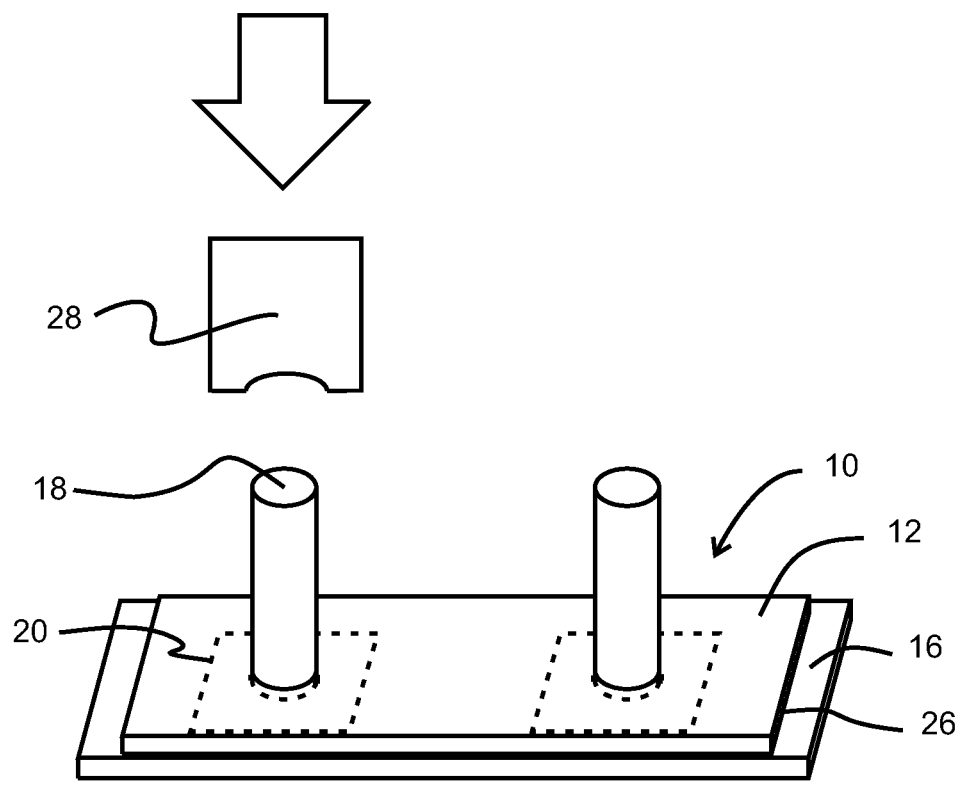
FIG. 1C depicts one variation of a joint design for improved strength of plastic and composite joints.
Figure 1D:
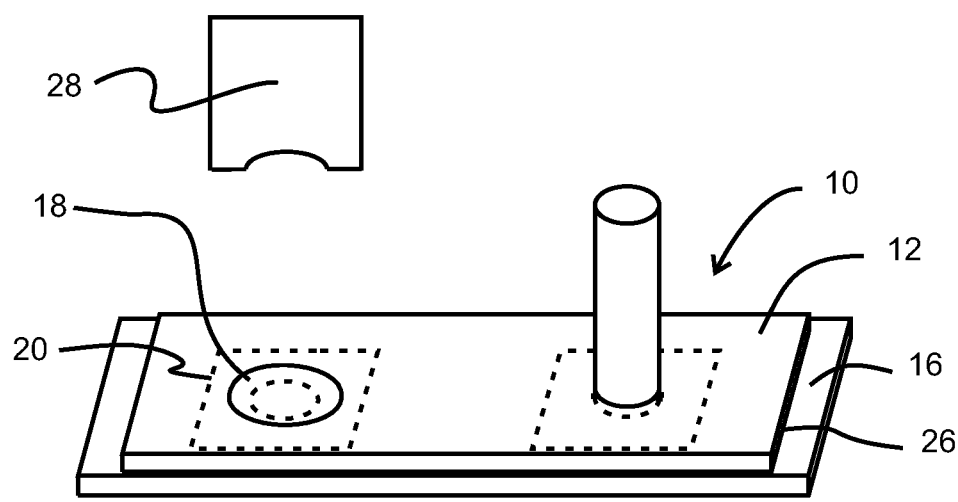
FIG. 1D depicts one variation of a joint design for improved strength of plastic and composite joints.

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Ultrasonic staking may include a process wherein high-frequency energy is used to generate frictional heat on a stake and may cause local melting of the stake which is then pressed under normal load and cooled so as to mechanically secure two or more parts together. Ultrasonic welding may include a process wherein high-frequency energy is used to generate frictional heat at an interface and may cause local welding and molecular diffusion of two or more parts.

Joining of complex plastic, composite, or metal parts may be achieved via ultrasonic welding wherein a plurality of parts or components may be fitted into a mold, a nest or a fixture and a sonotrode connected to a transducer and/or power supply constructed and arranged to apply vibrations to the plurality of parts. In this way, local melting may occur and weld the plurality of parts together. The process may further include using an energy director constructed and arranged to increase the efficiency of ultrasonic welding in desirable locations. The process may further include a protruding formation (e.g., stake or rivet) constructed to be melted ultrasonically via ultrasonic staking to increase peel strength of the joints by forming a mechanical interlock between both parts in desirable locations after application of the ultrasonic vibrations.

As stated within this document, the term "stake" may include, a rivet, a post, a spike, stick, pole, a stake that may be integrated within the first or second part, or any other comparable protrusion.

Referring to FIGS. 1A-1D; a final part 10 may be formed via ultrasonic staking and ultrasonic welding wherein a first part 12 having a first face 22 may be disposed over a second part 16 having a second face 24 such that the first face 22 abuts the second face 24. The first part 12 may define at least one through-hole 14. The second part 16 may include at least one stake 18 and at least one energy director 20 disposed circumferentially around the at least one stake 18. Alternatively, the at least one energy director 20 may be disposed on the first face 22 of the first part 12. When the first part 12 having a first face 22 is disposed over the second part 16 having a second face 24 such that the first face 22 abuts the second face 24, the at least one stake 18 may be disposed within the at least one through-hole 14. The first part 12 and the second part 16 may be subsequently ultrasonically staked and ultrasonically welded together via a sonotrode 28 to form an ultrasonically welded interface 26 and a final part 10.

Figure 2:
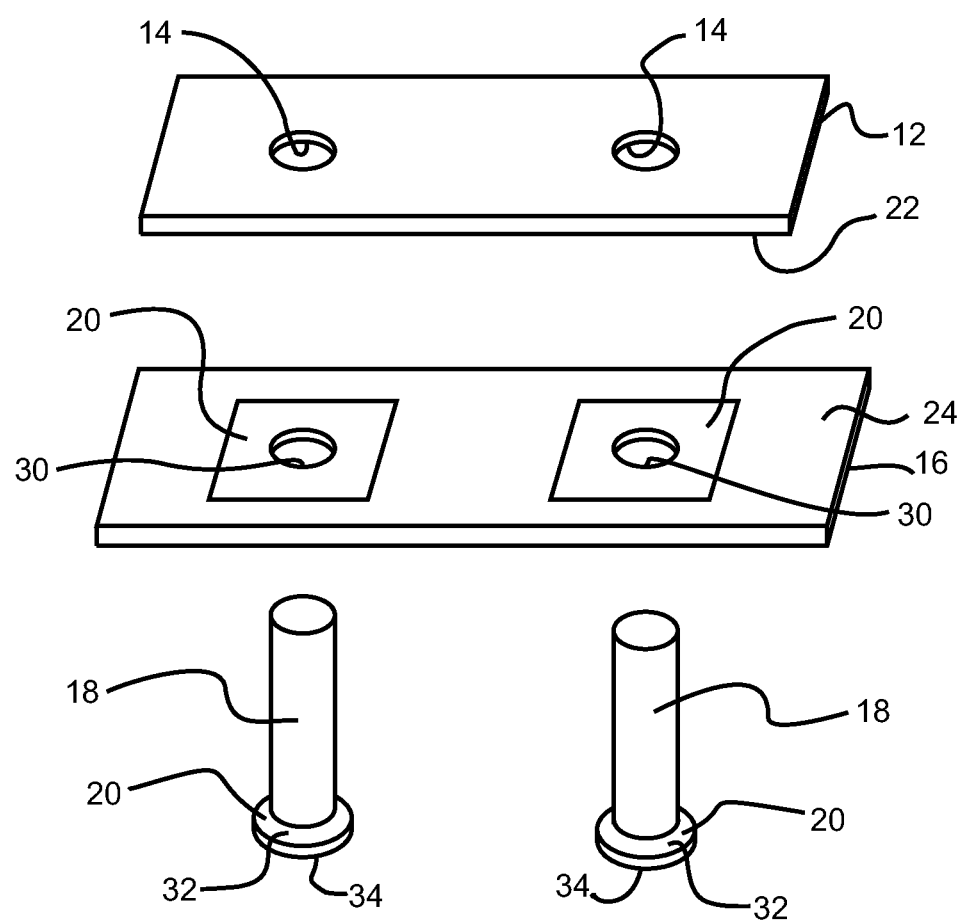
FIG. 2 depicts one variation of a joint design for improved strength of plastic and composite joints.

Referring to FIG. 2; a final part 10 may be formed via ultrasonic staking and ultrasonic welding wherein a first part 12 having a first face 22 may be disposed over a second part 16 having a second face 24 such that the first face 22 abuts the second face 24. The first part 12 may define at least one through-hole 14. The second part 16 may define at least one second through-hole 30. At least one stake 18 may include an abutting surface 32 on a head 34 and an energy director 20 disposed on the abutting surface 32. Alternatively, the at least one energy director 20 may be disposed on the first face 22 of the first part 12 or the second face 24 of the second part 16 or both or on the first face 22, the second face 24, and the abutting surface 32. When the first part 12 having a first face 22 is disposed over the second part 16 having a second face 24 such that the first face 22 abuts the second face 24, the at least one stake 18 may be disposed within the at least one through-hole 14 and the second through-hole 30. The first part 12 and the second part 16 may be subsequently ultrasonically staked and ultrasonically welded together via a sonotrode 28 to form an ultrasonically welded interface 26 and a final part 10.

According to one variation, a sonotrode may have a single set of parameters whereby both ultrasonic staking and welding may occur. Alternatively, the sonotrode may have a first set of parameters whereby ultrasonic staking is accomplished and a second set of parameter whereby ultrasonic welding may occur. Alternatively, a first tool may have a first set of parameters whereby ultrasonic staking is accomplished and a second tool may have a second set of parameter whereby ultrasonic welding may occur. That is, the ultrasonic staking and welding process may be a two-step or single, continuous step.

The first part may be a neat thermoset or thermoplastic resin, a reinforced thermoset or thermoplastic resins wherein reinforcement could be in the form of platelets, short fibers, long fibers, tubes, or a combination thereof and wherein the reinforcement could be carbon fiber, polymer fibers, glass fibers, inorganic fillers, or a laminated composite part.

The second part may be a hard or soft plastic, carbon-fiber reinforced thermo-plastic, or composite part. The first part and the second part may have similar transition temperatures, in particular glass transition temperature or melting transition temperature.

The at least one stake may be of the same material as the second part or the first part and may be cylindrical, rectangular, spike-shaped, or any other suitable shape for assisting in joining the first part and the second and increasing the peel strength of the finished final part. The at least one energy director may be constructed and arranged to concentrate the ultrasonic welding energy in desired locations, particularly around the stake where the first part and second part abut. The at least one energy director may include a plurality of raised triangles, ridges, tetrahedrons, beads, or other similarly shaped surface formations that are constructed and arranged to concentrate the ultrasonic welding energy in desired locations thereby increasing the weld size around the stake at the base of the stake and increasing the shear strength of the finished final part.

According to variation 1, a product may include a final part that may include a first part that may include a first face and may define at least one through hole and a second part that may include a second face, at least one stake, and at least one energy director that may be disposed between the first face and the second face wherein the first face and the second face may be abutted against one another and the at least one stake may be passed through the at least one through-hole and the first part and the second part have been ultrasonically staked and ultrasonically welded such that an ultrasonically welded interface may be formed between the first part and the second part.

Variation 2 may include a product as set forth in variation 1 wherein the at least one energy director may be disposed circumferentially around the at least one stake.

Variation 3 may include a product as set forth in variation 1 or 2 wherein the energy director may be disposed on at least one of the first face or second face or both.

Variation 4 may include a product as set forth in any of variations 1 through 3 wherein the first part may have a first phase transition temperature, such as a glass transition temperature or a melting transition temperature, and the second part may have a second phase transition temperature, such as a second glass transition temperature or a second melting transition temperature, wherein the first phase transition temperature and the second phase transition temperature differ by preferably less than about 10° C. but up to about 20° C. Variation 5 may include a product as set forth in any of variations 1 through 4 wherein the ultrasonic staking and ultrasonic welding may occur simultaneously. Variation 6 may include a product as set forth in any of variations 1 through 5 wherein the first part may include plastic and the second part may include plastic.

According to variation 7, a product may include a final part that may include a first part having a first face and defining at least one first through hole, a second part having a second face and defining at least one second through hole, at least one stake, and at least one energy director disposed between the first face and the second face wherein the at least one stake may be joined through the at least one through-hole and the at least one second through hole, and an ultrasonically staked and ultrasonically welded interface between the first part and the second part.

Variation 8 may include a product as set forth in variation 7 wherein the at least one energy director may be disposed on at least one of the first face or the second face or both.

Variation 9 may include a product as set forth in any of variations 7 through 8 wherein the first part may have a first phase transition temperature, such as a glass transition temperature or a melting transition temperature, and the second part may have a second phase transition temperature, such as a second glass transition temperature or a second melting transition temperature, wherein the first phase transition temperature and the second phase transition temperature differ by preferably less than about 10° C. but up to about 20° C.

Variation 10 may include a product as set forth in any of variations 7 through 9 wherein the stake may be a rivet may include a head may include an abutting face and wherein the at least one energy director may be disposed on the abutting face. Variation 11 may include a product as set forth in any of variations 7 through 10 wherein the first part may include plastic and the second part may include plastic.

Variation 12 may include a product as set forth in any of variations 7 through 11 wherein the ultrasonic staking and ultrasonic welding occurred simultaneously. According to variation 13, a method may providing an ultrasonic welding system may include a press, a power supply, a controller, an ultrasonic stack may include at least one transducer and at least one sonotrode; a first part may include a first face; a second part may include a second face; a stake; and at least one energy director disposed between at least the first face and the second face. The method may further include assembling the first part and the second part wherein the first face abuts the second face and the at least one stake mechanically mates the first part and the second part together. The method may further include supplying energy via the power supply to the at least one transducer and to the at least one sonotrode such that the first part and the second part may be ultrasonically staked together and an ultrasonic weld may be formed between the interface of the first face to the second face.

Variation 14 may include a product as set forth in variation 13 wherein the ultrasonic staking and the ultrasonic welding occur simultaneously.

Variation 15 may include a product as set forth in any of variations 13 through 14 wherein the energy director may be disposed on at least one of the first face or second face or both.

Variation 16 may include a product as set forth in any of variations 13 through 15 wherein the first part may have a first phase transition temperature such as a glass transition temperature or a melting transition temperature and the second part may have a second phase transition temperature wherein the first phase transition temperature and the second phase transition temperature differ by preferably less than about 10° C. but up to about 20° C.

Variation 17 may include a product as set forth in any of variations 13 through 16 wherein the first part may include plastic and the second part may include plastic.

Variation 18 may include a product as set forth in any of variations 13 through 17 wherein the at least one sonotrode may include a first sonotrode and a second sonotrode and the ultrasonic staking occurs via the first sonotrode and the ultrasonic welding occur via the second sonotrode.

Variation 19 may include a product as set forth in any of variations 13 through 18 wherein the stake may be a rivet that may include a head that may include an abutting face on the underside of the head and wherein the at least one energy director may be disposed on the abutting face such that when the stake is joined to a part, the energy director is disposed between the part and the underside of the head.

Variation 20 may include a product as set forth in any of variations 13 through 19 wherein multiple energy directors may be disposed on at least one of the first face or second face or both.

The above description of variations of the invention is merely demonstrative in nature and, thus, variations thereof are not to be regarded as a departure from the spirit and scope of the inventions disclosed within this document.

What is claimed is:

1. A method comprising:
providing an ultrasonic welding system comprising a press, a power supply, a controller, an ultrasonic stack comprising at least one transducer and at least one sonotrode; a first part comprising a first face; a second part comprising a second face; a stake; and at least one discrete energy director disposed between at least the first face and the second face;
assembling the first part and the second part wherein the first face abuts the second face and the at least one stake passes through a first through hole of the first part and a second through hole of the second part and mechanically mates the first part and the second part together;
supplying energy via the power supply to the at least one transducer and to the at least one sonotrode such that the first part and the second part are ultrasonically staked together and an ultrasonic weld is formed between the interface of the first face and the second face.

2. A method as set forth in claim 1, wherein the ultrasonic staking and the ultrasonic welding occur simultaneously.

3. A method as set forth in claim 1, wherein the discrete energy director is disposed on at least one of the first face or second face or both.

4. A method as set forth in claim 1 wherein the first part comprises a first phase transition temperature and the second part comprises a second phase transition temperature wherein the first phase transition temperature and the second phase transition temperature differ by about 0° C. to about 20° C.

5. A method as set forth in claim 1 wherein the first part comprises plastic and the second part comprises plastic.

6. A method as set forth in claim 1 wherein the at least one sonotrode comprises a first sonotrode and a second sonotrode and the ultrasonic staking occurs via the first sonotrode and the ultrasonic welding occur via the second sonotrode.

7. A method as set forth in claim 1 wherein the stake is a rivet comprising a head comprising an abutting face and wherein the at least one discrete energy director is disposed on the abutting face.

8. A method as set forth in claim 7 wherein multiple discrete energy directors are disposed on at least one of the first face, second face, or abutting face of the head.

* * * * *